United States Patent
Thorwall et al.

[11] Patent Number: 5,332,250
[45] Date of Patent: Jul. 26, 1994

[54] PINTLE HOOK

[75] Inventors: Gregory R. Thorwall; Gerald W. Hungerink, both of Holland, Mich.

[73] Assignee: Holland Hitch Company, Holland, Mich.

[21] Appl. No.: 997,672

[22] Filed: Dec. 28, 1992

[51] Int. Cl.⁵ ................................................ B60D 1/28
[52] U.S. Cl. .................................................... 280/507
[58] Field of Search ..................... 280/504, 507, 514; 292/210, 63, 67, 69

[56] References Cited

U.S. PATENT DOCUMENTS

| | | | |
|---|---|---|---|
| 3,963,266 | 6/1976 | Thelin | 280/504 |
| 4,568,098 | 2/1986 | Landry, Jr. | 280/416.1 |
| 4,758,015 | 7/1988 | Pixley | 280/507 X |

OTHER PUBLICATIONS

Holland PH-200 leaflet, copyright 1989.

*Primary Examiner*—David M. Mitchell
*Assistant Examiner*—Andrew C. Pike
*Attorney, Agent, or Firm*—Price, Heneveld, Cooper, DeWitt & Litton

[57] ABSTRACT

A pintle hook hitch having an outwardly upwardly curved, fixed horn, an outwardly extending pivotal latch arm movable between a lower, closed condition over the horn, and a raised open condition, the body having a jamb face for engagement by a lock, a primary lock pivotally shiftable between a lowered and locked position for abutment with the jamb face, and an unlocked position pivotally raised away from the jamb face, a vertical spring biasing the lock toward the lowered lock position, the primary lock also being laterally shiftable with a push button pivot pin between a first lateral position and a second lateral position, a lateral spring biasing the primary lock laterally toward the first lateral position. To pivotally open the latch arm, it is necessary to perform a three-step process of first pushing the second pivot pin laterally via the push button against the lateral spring bias to laterally shift the primary lock, then lift the primary lock against the bias of the vertical spring, and then lift the latch arm.

2 Claims, 6 Drawing Sheets

PINTLE HOOK

BACKGROUND OF THE INVENTION

This invention relates to pintle hook hitches for towing vehicles, and particularly pintle hook hitches with locking latch apparatus.

Conventional pintle hook hitches for trucks include an outwardly and upwardly curving horn over which a draw bar eye is placed for towing a trailer. To prevent the eye from inadvertently disengaging the pintle hook, a pivotal latch is customarily used. This latch pivots in a vertical plane from a lowered, closed and locked position over the horn, to a raised open position for connection or disconnection of the draw bar eye. Locking of the latch has for decades been achieved with an interference lock placed between the latch and another fixed part of the pintle hook body, to prevent the latch from pivotally raising until the lock is moved from its interference position. The lock has customarily been kept from so moving by a secondary lock in the form of a cotter pin or the like extended through the latch and attached to a chain to hopefully prevent it from becoming lost, as shown, for example, in U.S. Pat. No. 3,963,266.

In use of pintle hook hitches to tow a vehicle, the draw bar eye has some limited freedom of movement on the horn. This characteristic has been found objectionable by some users. Thus, several years ago employees of the assignee herein developed a pintle hook hitch which would have the eye pneumatically held when engaged over the horn. This hitch was designated the PH200 pintle hook hitch. Specifically, in this PH200 hitch 80 (FIGS. 8 and 9), an air operated plunger holds the eye to a small clearance relative to the horn inner surface, while above the plunger, the PH200 hitch has a pivotal latch 82 to close the pintle hook. The lock for this latch is a handle 84 which extends parallel to the latch and then bends about 90° and extends through the latch and through a pivotal lock 88 which projects into the interference position between the latch and the pintle hook body. This prior PH200 structure is shown in FIGS. 8 and 9 herein. The handle and pivotal lock are secured together and are spring biased to one side of the latch where the pivotal lever is prevented from being pivotally raised by a shoulder 86 on the latch. By laterally shifting the handle and the pivotal lock, the pivotal lock escapes from beneath the shoulder, allowing the handle and thus the pivotal lock to be rotated to release the latch. While still holding the handle in this condition, the latch can be pivotally raised to release the draw bar eye from the hook.

SUMMARY OF THE INVENTION

An object of the present invention is to provide a special pintle hook hitch with a manual push button and pin secondary lock in combination with a manually shiftable, pivotal primary lock, the release requiring three successive manual movements, i.e., 1) the push button and pin are laterally shiftable with one hand to push the pivotal primary lock out of interference with a lock shoulder, 2) the pivotal primary lock is manually pivotally lifted with the other hand to a release condition, to allow the latch to be lifted, and 3) the latch is lifted with the first hand to open the hitch.

Following this unlocking action requiring the threefold manual sequence to release the latch, the draw bar eye can be lifted off the pintle hook horn for disconnection. This sequence is intended to prevent accidental or inadvertent disengagement of the eye from the hook.

This same three-step sequence is also followed when preparing to connect another draw bar eye to the pintle hook. Reengagement of the latch, the primary lock and the secondary lock occurs automatically with manual release or lowering of the latch. Specifically, when the latch is manually released it drops down onto the pintle hook, when the primary lock is manually released a vertical spring biases it pivotally toward the locked position, and a lateral spring biases the primary lock laterally beneath the shoulder while biasing the push button laterally to the extended locked position. The hookup is thus secure.

These and other objects, advantages and features of the invention will become apparent upon studying the specification in conjunction with the drawings.

DESCRIPTION OF THE PREFERRED EMBODIMENT

Figure 1:
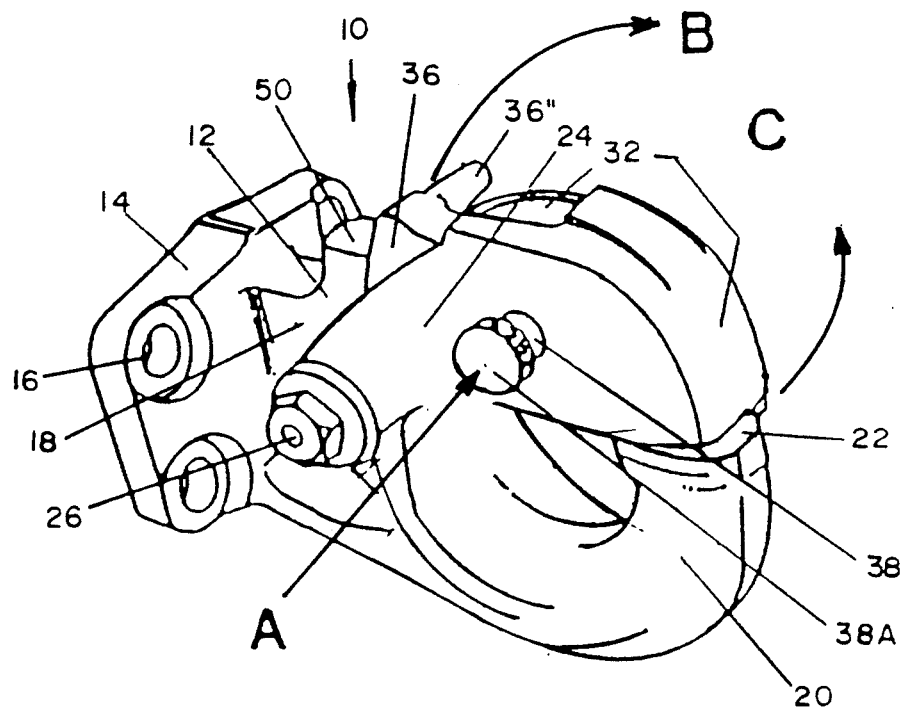
FIG. 1 is a perspective view of the novel pintle hook hitch.

The novel pintle hook hitch 10 includes a body 12 of steel having a vertical mounting base plate 14 of conventional type. The plate includes a plurality of bolt receiving orifices 16 for connecting the pintle hook body to a truck frame or the like. Body 12 also includes an integral, rearwardly projecting, central, vertical bracket 18 normal to plate 14, and which merges into a rearwardly, i.e., outwardly and upwardly, hook having a horn 20 terminating in an upper, generally horizontal contact surface 22. The pintle hook is typically generally semicircular in configuration.

Figure 2:
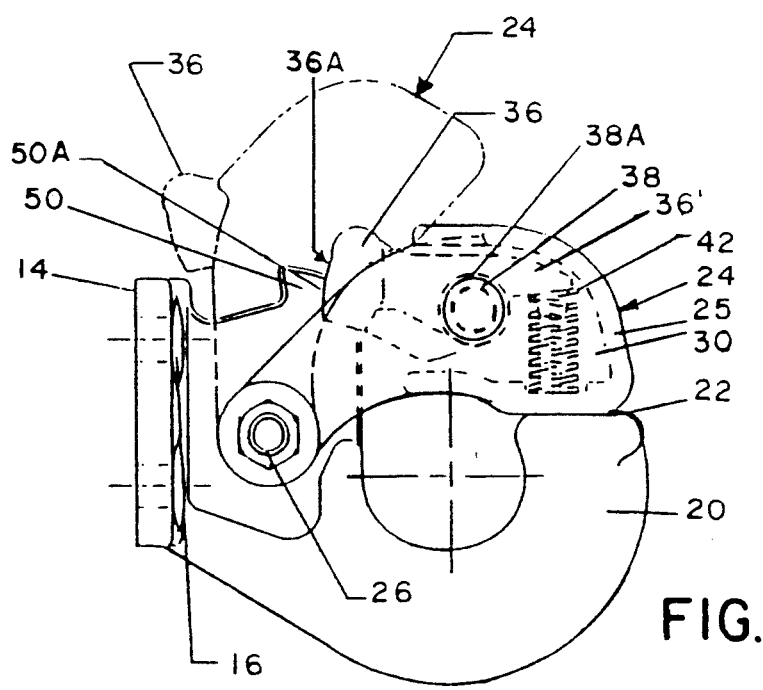
FIG. 2 is a side elevational view of the hitch.
Figure 3:
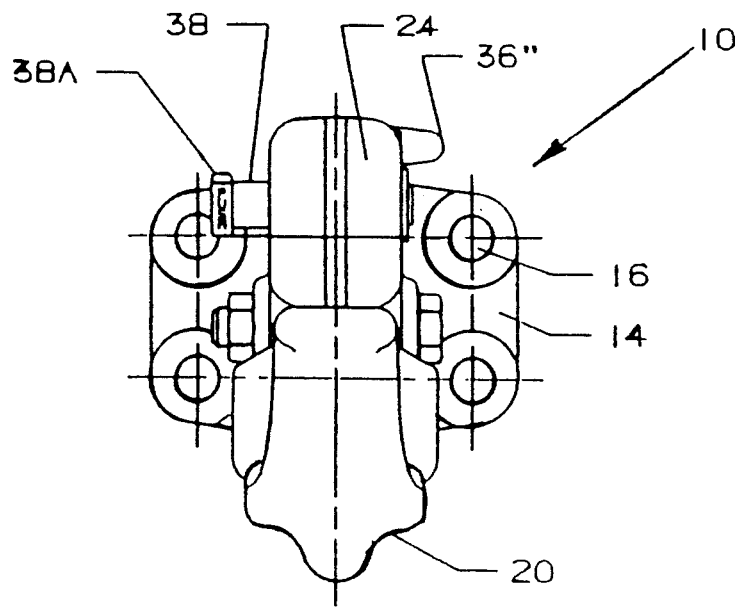
FIG. 3 is an end elevational view of the hitch.

Pivotally mounted intermediate the front and rear ends of the pintle hook body, and specifically adjacent the forward end of the hook, is a latch or latch arm 24. Latch 24 is pivotally attached by a first horizontal, transverse pivot pin 26 extending laterally of the hitch, this pin preferably taking the configuration of a bolt having an integral head on one end and a nut on the opposite end. Latch 24 is thus pivotally vertically movable between a lowered closed condition over the horn and at contact face 22 as depicted in FIGS. 1 and 2 in solid lines, and a raised, open condition spaced from the contact face as illustrated in phantom lines in FIG. 2, for connection or disconnection of the conventional eye of a draw bar (not shown).

Figure 4:
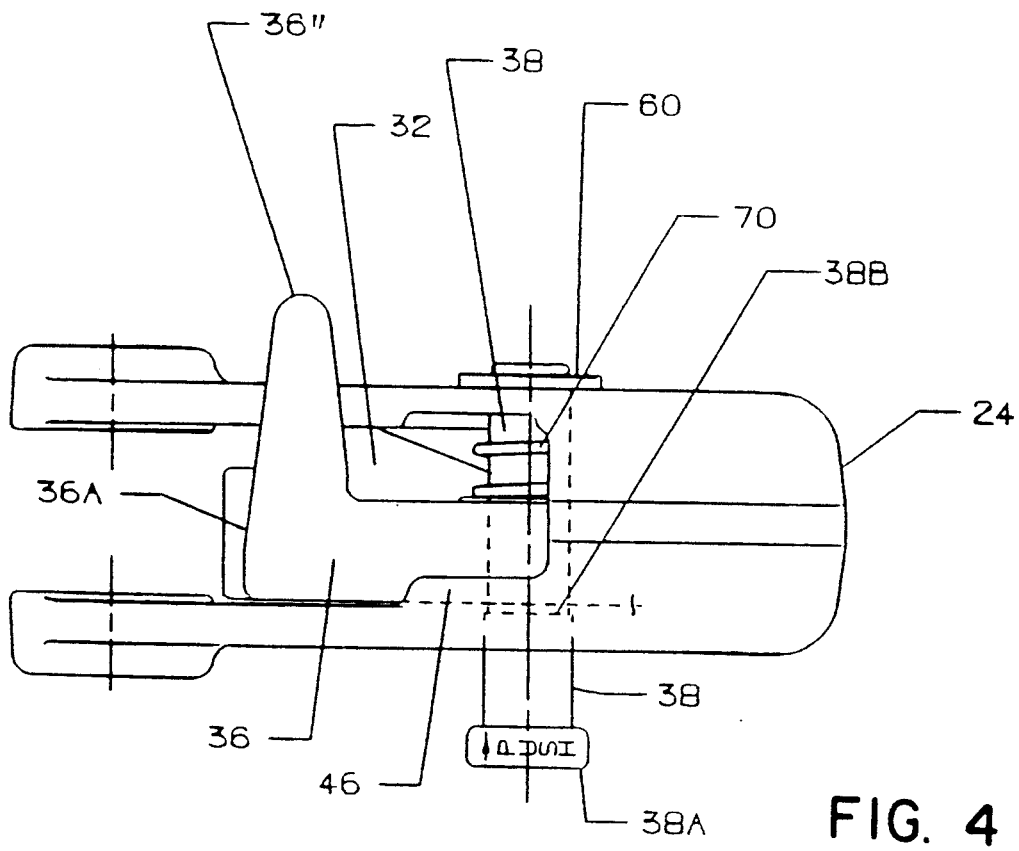
FIG. 4 is a top plan view of the latch.
Figure 5:
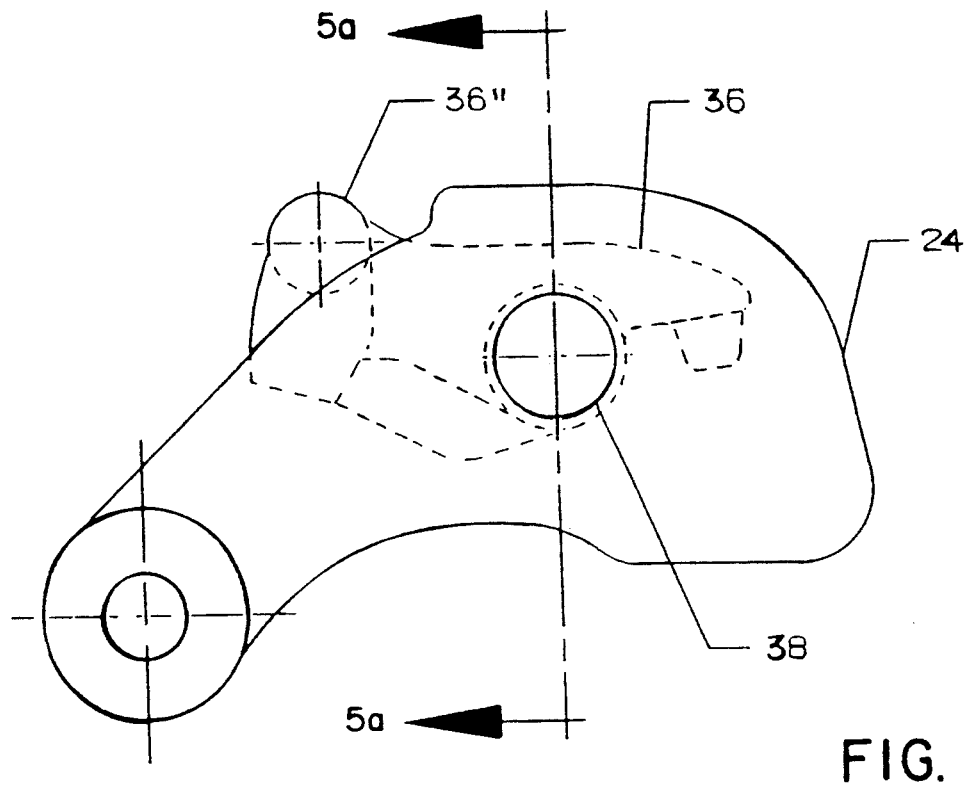
FIG. 5 is a side elevational view of the latch, primary lock and secondary lock, with the primary and secondary locks engaged.
Figure 5A:
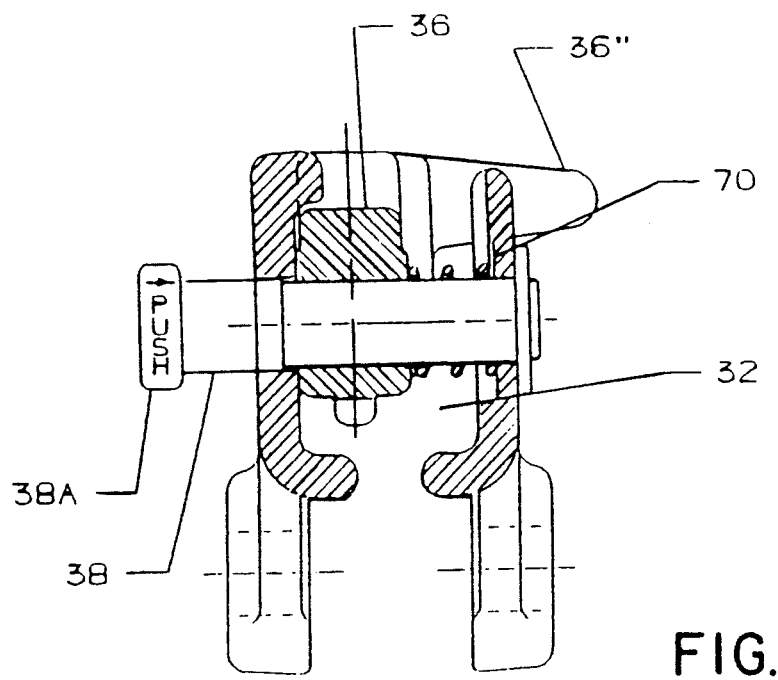
FIG. 5A is a sectional view through plane VA—VA of FIG. 5.
Figure 6:
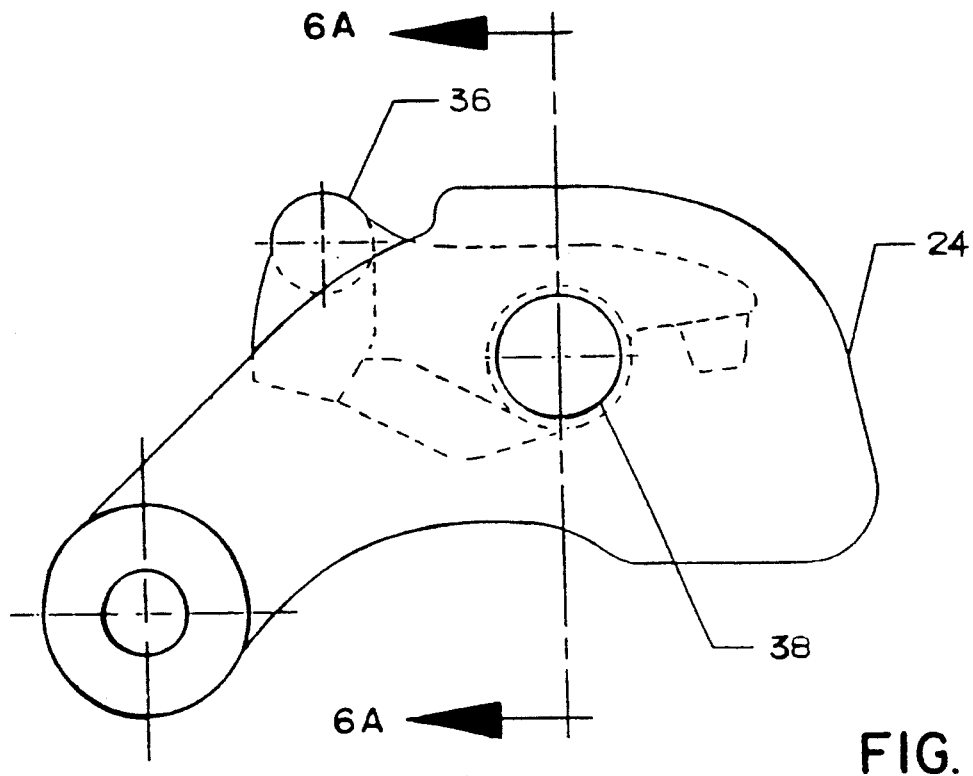
FIG. 6 is a side elevational view of the latch, primary lock and secondary lock, with the push button of the secondary lock laterally shifted to laterally shift the primary lock.
Figure 6A:
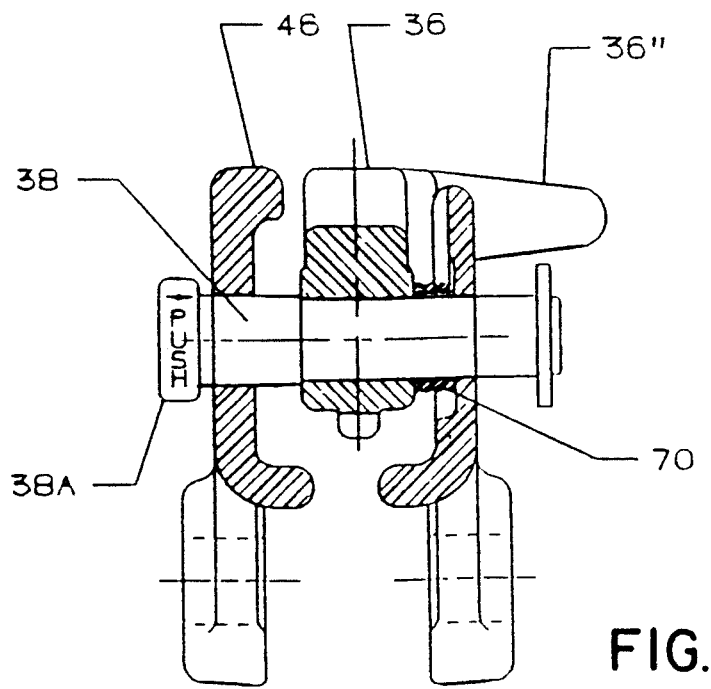
FIG. 6A is a sectional view taken through plane VIA—VIA of FIG. 6.
Figure 7:
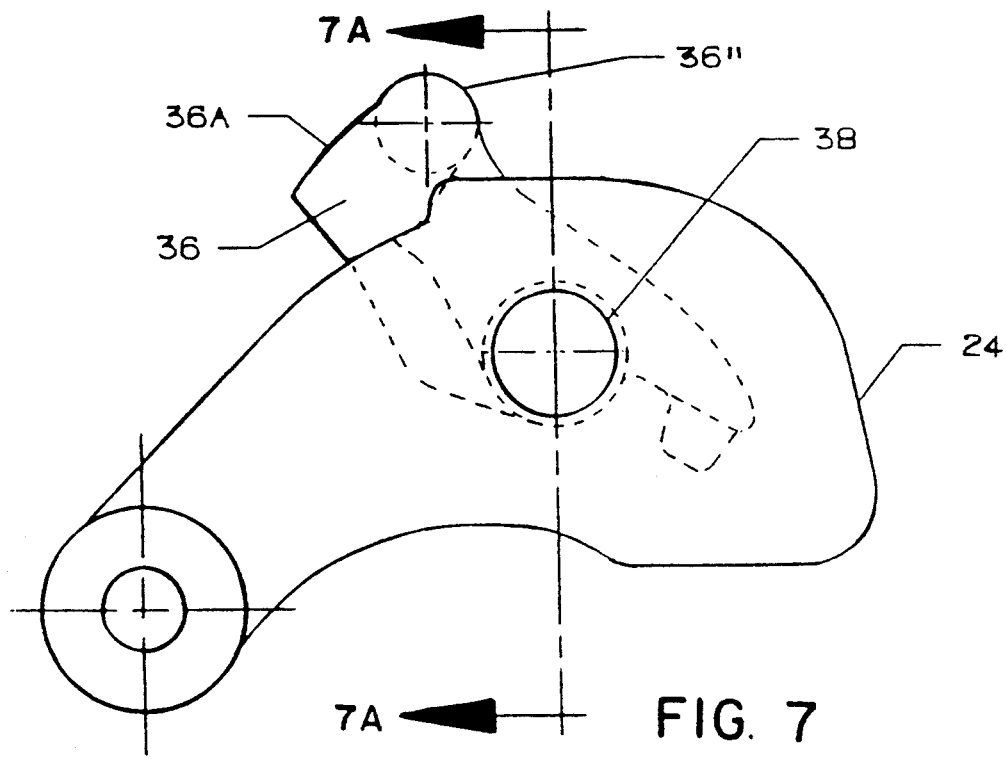
FIG. 7 is a side elevational view of the latch, primary lock and secondary lock, with both the primary and secondary locks released.
Figure 7A:
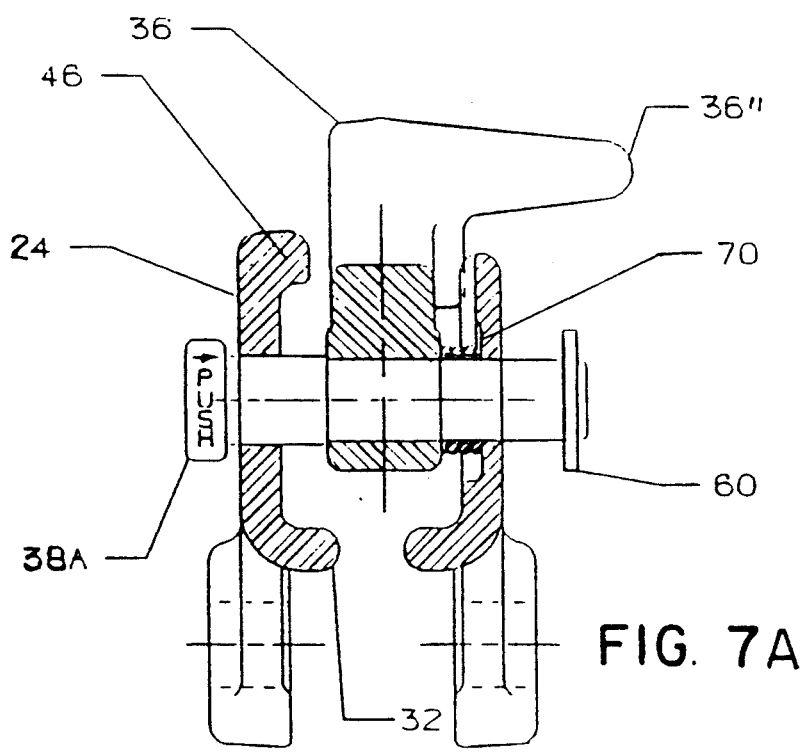
FIG. 7A is a sectional view taken through plane VIIA—VIIA of FIG. 7.
Figure 8:
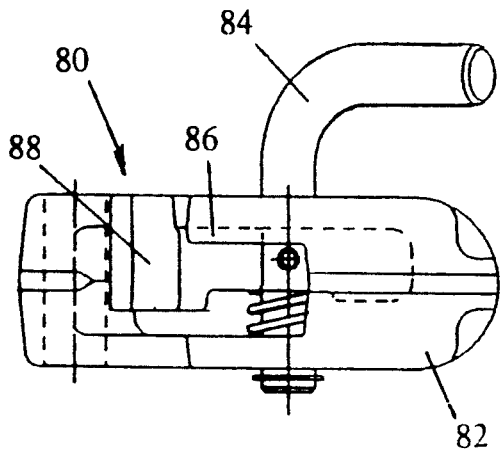
FIG. 8 is a top plan view of a prior art pintle hook and lock mechanism of the hitch identified as PH200.
Figure 9:
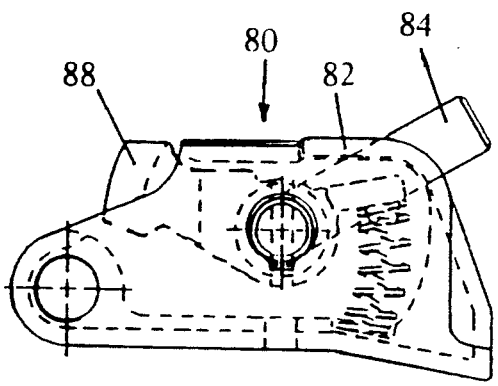
FIG. 9 is a side elevational view of a prior art pintle hook latch and lock mechanism of hitch PH200.

Latch 24 has a generally hollow housing 25 to define an interior space 30 (FIG. 2), there being an upper slot 32 (FIG. 4) in the housing to provide an opening between space 30 and the exterior of latch 24. Positioned in space 30 is a primary lock lever 36 rotatably mounted on a second pivot pin 38 which extends laterally, i.e., parallel to, pivot pin 26, through both opposite side walls of the housing of latch 24 and through primary lock 36. Inside space 30, between the rear nose 36' of primary lock 36 (FIG. 2) and the inside lower surface of the housing of latch 24, is a vertical compression coil spring 42 to bias the rear end of primary lock upwardly and the forward end of primary lock 36 downwardly, about pivot pin 38. Extending laterally from the forward end of lock 36, beyond the adjacent wall of housing 25, is a manually operable tang 36''. Elevation of tang 36'' pivots lock 36 about the second pivot pin 38 against the bias of spring 42 in a manner to be described more fully hereinafter. In the locked position depicted in FIGS. 4, 5 and 5A, primary lock 36 cannot be rotated about pin 38 to elevate the primary lock due to an overhang shoulder or ledge 46 which protrudes into upper slot 32 on one side of housing 25. On the forward end of lock 36 is an interference face 36A adjacent the jamb face 50A of a fixed stop 50 forming an integral part of body 18, and particularly the rearwardly extending central flange thereof (FIG. 2). Therefore, effort to lift latch 24 simply results in abutment of face 36A against face 50A.

Pivot pin 38 extends through both walls of housing 25. One extended end of pin 38 is spun over a washer 60. The opposite end extends further beyond the housing of latch 24 and terminates in an enlarged push button 38A, there being a clearance area between head 38A and the adjacent side wall of latch 24 to enable pin 38 to be pushed a substantial fraction of an inch laterally toward the latch. Push pin 38 has an enlarged diameter to define a shoulder 38B engageable with primary lock 36. Push pin 38 and lock 36 are normally biased toward the one side of latch 24 by a lateral compression coil spring 70 located between the one side of primary lock 36 and the opposing side inner wall of housing 25. The three steps of opening the pintle hook latch are shown by arrows A, B and C in FIG. 1. The position of the components during the sequence of unlocking the primary and secondary locks is illustrated specifically in FIGS. 5, 5A, 6, 6A, 7 and 7A.

By pressing laterally on push button 38A of push pin 38 with the first hand, the pin can be caused to shift against the bias of lateral spring 70, so that shoulder 38B engaging primary lock 36 shifts the primary lock laterally as well, until the primary lock is moved out from under ledge 46 and is aligned fully with slot 32. Under this condition, tang 36'' of lock 36 can be manually lifted with the second hand to pivot primary lock 36 about pin 38 against the bias of vertical compression spring 42. Push pin 38 thus acts as a secondary lock. When primary lock 36 is upwardly pivoted, interference face 36A is moved out of engagement with fixed stop surface 50A allowing latch 24 to be pivoted upwardly on pin 26 with the first hand, to the release position uncovering the hook, as depicted in FIG. 2 in phantom lines.

It is conceivable that those having skill in this field could modify the present invention in minor ways without departing from the concept presented. Hence, it is intended that the invention is to be limited only by the scope of the appended claims and the reasonable equivalents thereto, rather than to the preferred specific embodiment set forth as illustrative of the invention.

The embodiments of the invention in which an exclusive property or privilege is claimed are defined as follows.

1. A pintle hook hitch requiring a sequential three-step process to open, comprising:
   a body having means for mounting said body to a tow vehicle;
   an outwardly upwardly curved, fixed horn integrally extending from said body and terminating in a contact face;
   an outwardly extending latch arm pivotally attached by a first pivot pin to said body and movable between a lower, closed condition over said horn at said contact face of said horn, and a raised open condition spaced from said contact face to allow release of a connecting eye;
   said body having a jamb face for engagement by a primary lock;
   said primary lock pivotally mounted by a second pivot pin on said latch arm and shiftable between a lowered locked position for abutment with said jamb face, and an unlocked position pivotally raised away from said jamb face;
   vertical spring means between said primary lock and said latch arm for biasing said lock toward said lowered locked position;
   said primary lock also being laterally shiftable with said second pivot pin between a first lateral position and a second lateral position;
   lateral spring means between said lock and said latch arm for biasing said primary lock laterally toward said first lateral position;
   said latch arm having a slot through which said pivotal primary lock is vertically movable when in said second lateral position, and having an interference ledge engaging said pivotal primary lock and preventing it from pivoting to said unlocked position when in said first lateral position;
   said second pivot pin extending beyond said latch arm and terminating in a push button; and
   said second pin having a lock engager located such that lateral pressure on said push button will laterally shift said second pivot pin and said primary lock from said first position to said second position whereby, to pivotally open said latch arm, it is necessary to perform a three-step process of first pushing said second pivot pin laterally via said push button against the bias of said lateral spring means to thereby laterally shift said primary lock from said first position to said second position, then lift said primary lock through said slot against the bias of said vertical spring means, and then lift said latch arm.

2. The pintle hook hitch in claim 1 wherein upon reclosing said latch arm said vertical spring means is adapted to shift said primary lock back to said lowered locked position, and said lateral spring means is adapted to shift said second pivot pin and said primary lock back to said first lateral position, thereby locking said latch arm over said fixed horn.

* * * * *